UNITED STATES PATENT OFFICE.

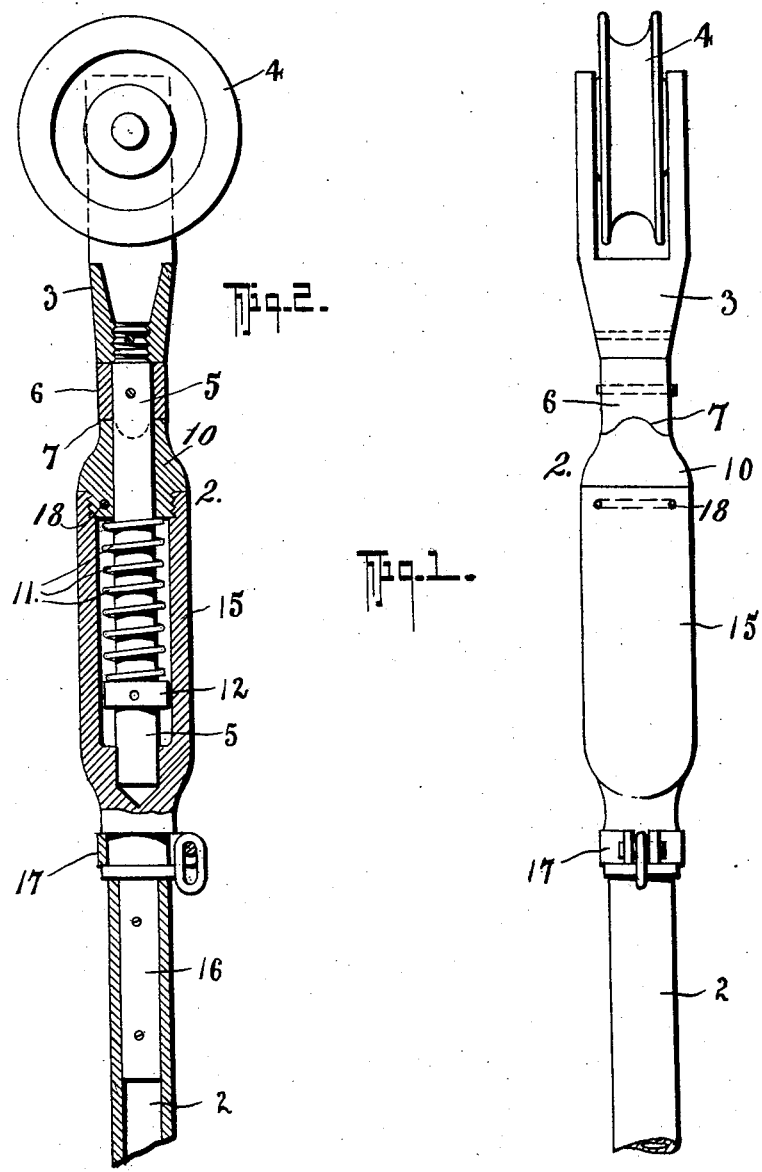

JAMES CHAS. MATTISON, OF VANCOUVER, BRITISH COLUMBIA, CANADA.

TROLLEY-HEAD.

1,033,335.  Specification of Letters Patent.  Patented July 23, 1912.

Application filed September 22, 1911. Serial No. 650,674.

*To all whom it may concern:*

Be it known that I, JAMES C. MATTISON, a citizen of the Dominion of Canada, residing at Vancouver, in the Province of British Columbia, Canada, have invented a new and useful Trolley-Head, of which the following is a specification.

This invention relates to an electric railway car trolley head and the improvement is directed to a provision in the connection of the wheel head to the trolley pole that will permit the wheel to relieve itself of the crosswise strain to which it is exposed when the car moves laterally, as in taking a curve.

Owing to the fact that the trolley wheel is necessarily considerably behind the connection of the trolley pole to the roof of the car the car body must move laterally before the trolley wheel when the car takes a curve, and the consequent angling of the trolley pole in relation to the wire draws the flanges of the trolley wheel crosswise on the wire, causing objectionable wear of the flanges and bearings of the trolley wheel and of the wire itself, and frequently leading the trolley wheel to jump off the wire with the consequent injury to the guy wires and loss of time in restoring it. In the invention, which is the subject of this application, this defect has been remedied by mounting the trolley head to the pole so that it is free to turn on the axis of the pole and relieve the cross strain and the mounting has been designed so as to be readily adaptable to existing trolley heads and poles without change thereto. Due provision has been made also to render the attachment simple in construction and serviceable in wear and without projections to catch on the guy wires in the event of the trolley wheel getting off the wire.

The invention is particularly described in the following specification, reference being made to the drawings by which it is accompanied, in which:

Figure 1 is an edge view of the trolley wheel showing its attachment to the pole. Fig. 2, a vertical section through the trolley head and its connections.

In these drawings 2 represents the upper end of the trolley pole, 3 being the forked head supporting the grooved trolley wheel 4. This wheel carrying head 3 under ordinary circumstances is rigidly secured to the upper end of the trolley pole 2. On the stem 5 of this head, which is usually inserted and secured in the tubular end of the pole, I pin or otherwise secure a sleeve 6 the end face of which, as at 7, is formed as a double wave, and loosely mounted on the same pin 5 so as to be susceptible of pivotal and endwise movement on it is a similar sleeve 10 having an end contact face waved to correspond with that 7 and in contact with it. This loose sleeve 10 is retained in contact with the fixed sleeve 6 by a coiled spring 9 interposed between it and a collar 12 pinned or otherwise secured to the stem 5, which stem projects beyond the collar to form an end support in a bearing to be described.

The sleeve 10 is threaded and shouldered for attachment to a hollow spring casing 15, which is provided with a stem 16 corresponding to the stem 5 of the head 3 so that it can be secured in the tubular end of the trolley pole 2 in the position usually occupied by the stem of the head in the ordinary trolley construction, and the attachment of the sleeve 10 to the casing 15 is rendered more secure by a pin 18 which is drilled for and fitted after the sleeve is tightly screwed into the casing and against its shoulder. The lower end of the casing 15 is drilled to form a bearing for the extreme end of the stem 5, so that its stem is supported by two bearings formed by the contacting surface 7 between the members 6 and 10, spaced well apart, that in the sleeve 10 and that in the bottom of the casing 15. Thus constructed the casing 15 and sleeve 10 are practically part of the trolley pole, being rigidly secured thereto, but the trolley head 3 is axially movable in relation to the trolley pole, and that rotational movement is against the resistance of the spring 9, as before the head 3 can rotate, it must, owing to the wavelike contact 7, move endwise outward against the resistance of the spring 9. Thus when the body of the car moves laterally when taking a curve and the flanges of the sleeve are, by the angling of the pole, drawn diagonally across the trolley wire, the head 3 will turn in the bearings of its stem 5, and will relieve the crosswise strain.

As explained, the swiveling attachment can be applied to existing trolley poles and heads without alteration or change of parts, and the attachment is an advantage as the sheave carrying head 3 is more readily removable for repair or renewal than where the head is connected direct to the pole, as it is only necessary to drive out the securing pin and unscrew the collar 10 from the spring casing 15 instead of having to remove the riveted pins by which the head 3 is usually secured to the pole.

The wavelike contour of the contacts at 7 afford an ample bearing surface to resist wear and will normally maintain the trolley wheel in its alinement with the pole, yielding only against the resistance of the spring 9. The attachment offers no projections to catch the trolley wire in the event of the wheel getting off the wire and the head stem 5 is strongly supported by its bearings to endure the severe wear and tear to which a trolley head is commonly subjected. A further advantage of this construction lies in the facility for endwise movement of the stem 5 of the trolley head 3 in its bearings. When the wheel meets with an obstruction, instead of having to overcome the inertia of the trolley pole, it may yield outward against the resistance of the spring 9 and thus break any severe shock to which it may be exposed. In other words, if the lower end of the trolley pole is carried laterally and the wheel is retained in the straight line of the track by the bearing of the groove of the sheave on the wire obviously the rotational strain will be imposed upon the trolley head and this tendency is met by the inclined or waved contact bearing 7 and since turning the head on that waved contact must withdraw the stem 5 from the spring casing and compress the spring, that tendency will be resisted.

The casing member 15 adjacent to its stem 16 has a groove formed in it in which a band clamp 17 may be secured, the securing bolt or rivet of the clamp having a loose ring or link for attachment of the trolley cord.

I am aware that prior to my invention provision has been made whereby trolley heads are axially movable in relation to the pole but all such devices have, within my experience, been lacking in the practical features of design to which I have drawn attention in the foregoing specification and have, on that account, not been workable.

What I claim is—

1. In an electric car trolley head, the combination with a wheel carrying head having a stem, a shoulder member of wavelike contour carried by said stem, a sleeve loosely mounted on the stem, said sleeve having a wavelike end corresponding with said shoulder, a collar secured on said stem, a spring interposed between the loose sleeve and said collar, a spring inclosing casing removably secured to the loose sleeve, said casing having a bearing in one end for the stem of the head, and means for securing the spring casing to a trolley pole.

2. A wheel carrying head, said wheel carrying head having a stem, a sleeve removably secured on said stem, the end of which sleeve has a wavelike contour, a similar sleeve freely movable on the said stem and having a wavelike contour corresponding with that of the fixed sleeve, yielding means for holding the sleeves in contact with one another and an inclosing casing for said yielding means removably secured to the loose sleeve and securable to a trolley pole.

3. A wheel carrying head having a stem, a collar secured adjacent to the end on said stem, a sleeve secured on said stem, the end of said sleeve having a wavelike contour, a similar sleeve freely movable on the said stem and having a corresponding wavelike contour in engagement with that of the fixed sleeve, a spring interposed between the loose sleeve and the collar secured adjacent to the end on the stem of the head, a spring casing removably secured to the loose sleeve and having a bearing for the reception of said stem, said casing having a stem corresponding to that of said head for attachment to the trolley pole.

4. In a trolley, the combination with the wheel carrying head having a stem, of a sleeve removably secured on said stem the lower end of which sleeve has a double wavelike contour, a second sleeve loosely mounted on the said stem, its end conforming with the wavelike contour of the fixed sleeve, a collar on said stem adjacent to its end, a spring between the loose sleeve and said collar, a spring casing threaded to fit on a corresponding thread of the loose sleeve and having a bearing adapted to receive the end of said stem, said spring casing having a stem adapted to fit and be secured in the upper end of the trolley pole and provision adjacent to said casing stem for the attachment of a haul down line.

5. In a trolley head, the combination with the trolley pole, of a chambered member projecting from the end of said trolley pole, a sleeve cap secured in the outer end of said projecting member, a trolley head, a stem on said trolley head projecting through said sleeve into said chambered member, resilient means in said chambered member coöperative with said stem and said sleeve for continuously tending to move said trolley head toward said sleeve, a sleeve secured to said stem between said trolley head and said first mentioned sleeve, the contacting surfaces between said sleeves being of wavelike contour, the external surfaces of said trolley head, said sleeves and said chambered member at the places of contact between the respective members merging with one another to leave a free and unobstructed surface from the trolley wheel to the pole, over which a trolley wire will slide without catching, and a trolley wheel carried by said trolley head.

In testimony whereof I have signed my name to this specification in the presence of two subscribing witnesses.

JAMES CHAS. MATTISON.

Witnesses.
 ROWLAND BRITTAIN,
 D. ROBILLIARD.

Copies of this patent may be obtained for five cents each, by addressing the "Commissioner of Patents, Washington, D. C."